(12) United States Patent
Neander et al.

(10) Patent No.: US 11,618,500 B2
(45) Date of Patent: Apr. 4, 2023

(54) METHOD AND SYSTEM FOR CONTROLLING STEERING OF A VEHICLE

(71) Applicant: Volvo Truck Corporation, Gothenburg (SE)

(72) Inventors: Gustav Neander, Gothenburg (SE); Jan-Inge Svensson, Gothenburg (SE); Mats Fagergren, Kungälv (SE)

(73) Assignee: Volvo Truck Corporation, Gothenburg (SE)

( * ) Notice: Subject to any disclaimer, the term of this patent is extended or adjusted under 35 U.S.C. 154(b) by 176 days.

(21) Appl. No.: 17/255,577

(22) PCT Filed: Jun. 27, 2018

(86) PCT No.: PCT/EP2018/067196
§ 371 (c)(1),
(2) Date: Dec. 23, 2020

(87) PCT Pub. No.: WO2020/001758
PCT Pub. Date: Jan. 2, 2020

(65) Prior Publication Data
US 2021/0284231 A1 Sep. 16, 2021

(51) Int. Cl.
*B62D 6/04* (2006.01)
*B62D 15/02* (2006.01)
(52) U.S. Cl.
CPC ............ *B62D 6/04* (2013.01); *B62D 15/025* (2013.01)
(58) Field of Classification Search
CPC ................................ B62D 6/04; B62D 15/025
See application file for complete search history.

(56) References Cited

U.S. PATENT DOCUMENTS

| 8,392,064 B2 | 3/2013 | Thrun |
| 2008/0189012 A1 | 8/2008 | Kaumann |

(Continued)

FOREIGN PATENT DOCUMENTS

| CN | 1907786 A | 2/2007 |
| CN | 103043054 A | 4/2013 |

(Continued)

OTHER PUBLICATIONS

Machine translation of CN-108068801-A (Year: 2018).*

(Continued)

*Primary Examiner* — Jeff A Burke
*Assistant Examiner* — Mohamad O El Sayah
(74) *Attorney, Agent, or Firm* — Withrow & Terranova, PLLC

(57) ABSTRACT

The invention relates to a method of controlling steering of a vehicle (1), comprising the steps of: acquiring (S1) a signal indicative of a driver request indicative of a desired wheel angle of a turnable vehicle wheel (5); determining (S2), based on the signal indicative of the driver request, a control signal for an actuator (13) coupled to the turnable vehicle wheel to achieve the desired wheel angle; controlling (S3) the actuator (13) using the control signal; detecting (S4) an abrupt wheel disturbance event; and in response to detecting the abrupt wheel disturbance event: acquiring (S5), from a lane detecting arrangement (19), a signal indicative of a lane curvature ahead of the vehicle (1); and controlling (S6) the actuator (13) based on the lane curvature ahead of the vehicle (1).

3 Claims, 3 Drawing Sheets

(56) References Cited

U.S. PATENT DOCUMENTS

| | | | |
|---|---|---|---|
| 2009/0299573 A1 | 12/2009 | Thrun | |
| 2010/0191421 A1* | 7/2010 | Nilsson | B62D 6/003 |
| | | | 701/41 |
| 2014/0297122 A1 | 10/2014 | Kouchi | |
| 2015/0094915 A1 | 4/2015 | Oyama | |
| 2015/0274203 A1 | 10/2015 | Takeda | |
| 2018/0265127 A1* | 9/2018 | Walsh | B62D 15/021 |
| 2019/0063913 A1* | 2/2019 | Leone | G01M 17/06 |
| 2019/0302763 A1* | 10/2019 | Kondo | B60W 30/10 |

FOREIGN PATENT DOCUMENTS

| | | | |
|---|---|---|---|
| CN | 105377658 A | | 3/2016 |
| CN | 105416287 A | | 3/2016 |
| CN | 108068801 A | * | 5/2018 |
| EP | 1749730 A2 | | 2/2007 |
| JP | 2010120532 A | | 6/2010 |
| KR | 20120026712 A | | 3/2012 |
| WO | 2017095300 A1 | | 6/2017 |

OTHER PUBLICATIONS

First Office Action for Chinese Patent Application No. 201880094790.0, dated May 20, 2022, 12 pages.
International Search Report and Written Opinion for PCT/EP2018/067196 dated Mar. 11, 2019, 11 pages.
International Preliminary Report on Patentability for PCT/EP2018/067196 dated Apr. 17, 2020, 16 pages.

* cited by examiner

METHOD AND SYSTEM FOR CONTROLLING STEERING OF A VEHICLE

This application is a 35 USC 371 national phase filing of International Application No. PCT/EP2018/067196, filed Jun. 27, 2018, the disclosure of which is incorporated herein by reference in its entirety.

TECHNICAL FIELD

The invention relates to a method and system for controlling steering of a vehicle, and to a vehicle comprising such a steering system.

The invention can be applied in heavy-duty vehicles, such as trucks, buses and construction equipment. Although the invention will be described with respect to a truck, the invention is not restricted to this particular vehicle, but may also be used in other vehicles, for instance buses or various kinds of working vehicles, such as wheel loaders, excavators, or articulated haulers etc.

BACKGROUND

The steering system is important for safe driving of any vehicle. Drivers of heavy vehicles in particular may need more steering assistance due to the weight of the vehicle, and the vehicle may be subjected to relatively large external disturbances influencing the steering, such as gusts of wind, etc.

For driver assistance, a steering system may include a lane detecting arrangement, which detects a lane curvature ahead of the vehicle. Based on signals from such a lane detecting arrangement, the steering system can assist the driver in keeping the vehicle in the lane by automatically controlling the steering so that the vehicle remains in the lane. An example of a steering system with lane detection is described in US 2015/0094915.

For driver convenience, it may be desirable to allow the driver to disable steering assistance based on lane detection. At the same time, safety should not be compromised.

SUMMARY

An object of the invention is to provide for improved steering control of a vehicle, in particular steering control that provides for convenience for the driver as well as improved safety.

According to a first aspect of the invention, this object is achieved by a method of controlling steering of a vehicle having a steering input device; at least one turnable vehicle wheel; and a steering system comprising: a steering request detector for receiving, from the steering input device, a driver request indicative of a desired wheel angle of the turnable vehicle wheel; an actuator for acting on the at least one turnable vehicle wheel to achieve the desired wheel angle; and a lane detecting arrangement for detecting a lane curvature ahead of the vehicle, the method comprising the steps of: acquiring, from the steering request detector, a signal indicative of the driver request; determining, based on the signal indicative of the driver request, a control signal for the actuator to achieve the desired wheel angle; controlling the actuator using the control signal; detecting an abrupt wheel disturbance event; and in response to detecting the abrupt wheel disturbance event: acquiring, from the lane detecting arrangement, a signal indicative of the lane curvature ahead of the vehicle; and controlling the actuator based on the lane curvature ahead of the vehicle.

A "wheel disturbance event" may be any event that would cause an abrupt change in wheel angle of the turnable vehicle wheels, unless counteracted. Examples of wheel disturbance events include tire explosion and bearing malfunction, etc.

The "lane detecting arrangement" may, as is well known to those of ordinary skill in the art, any one of various devices capable of detecting the lane curvature ahead of the vehicle. Such devices may, for example, include one or several cameras or other optical sensors capable of sensing electromagnetic waves in in visible as well as non-visible wavelength ranges.

It should be noted that the driver request may directly or indirectly indicate a desired wheel angle. For instance, the driver request may indicate a desired lateral acceleration of the vehicle or a desired trajectory of the vehicle, both of which are indirect indications of the desired wheel angle(s) of one or several turnable vehicle wheels.

The present invention is based on the realization that improved driving safety can be achieved detecting an abrupt wheel disturbance event, such as a tire explosion, and activating lane detection in response to the detection of the abrupt wheel disturbance event.

The driver may be allowed to deactivate the lane keeping system, or the lane keeping system may be automatically deactivated in situations where the lane cannot be detected with sufficient certainty etc. According to aspects of the present invention, the lane keeping system may be automatically activated, even if the lane detection is considered to be insufficient for regular operation, in response to the detection of a front tire explosion or other abrupt wheel disturbance event. Hereby, the lane keeping system can assist the driver in keeping the vehicle on the road, reducing the risk of an accident.

According to various embodiments, the step of detecting the abrupt wheel disturbance event may comprise the steps of: acquiring a signal indicative of an actual steering torque required to achieve a desired wheel angle; and determining an occurrence of the abrupt wheel disturbance event based on the signal.

In these embodiments, the actuator acting on the at least one turnable vehicle wheel may comprise at least one of a hydraulic actuator and an electric actuator. Advantageously, the actuator may comprise a combination of an electric actuator (motor) and a hydraulic actuator. For example, the above-mentioned driver request may be provided as a control signal to the electric motor, which may in turn control operation of the hydraulic actuator, which acts on the at least one turnable vehicle wheel.

In such embodiments, in which a control signal indicative of the driver request is provided to an electric motor, the magnitude of the current drawn by the electric motor to achieve the desired wheel angle indicated by the control signal is a measure of the actual steering torque required to achieve the desired wheel angle. If this actual steering torque suddenly becomes significantly higher, or higher than expected, this may be an indication of the occurrence of an abrupt wheel disturbance event, such as a tire explosion.

For higher precision in the determination of the occurrence of an abrupt wheel disturbance event, the step of determining may comprise the steps of determining an undisturbed steering torque required to achieve the desired wheel angle in the absence of disturbances; comparing the actual steering torque with the undisturbed steering torque; and determining the occurrence of the abrupt wheel disturbance event based on the comparison between the actual steering and the undisturbed steering torque. The undisturbed steering torque required to achieve the desired wheel angle in the absence of disturbances may, for example, be determined by a steering control unit of the steering system, using a predetermined vehicle model.

It may be determined that the abrupt wheel disturbance has occurred when a difference between the actual steering torque and the undisturbed steering torque is greater than a predefined threshold difference.

For improved precision in the determination of the occurrence of an abrupt wheel disturbance, it may be determined that the abrupt wheel disturbance has occurred when the difference between the actual steering torque and the undisturbed steering torque is greater than the predefined threshold difference during a time period that is longer than a predefined threshold time period.

According to a second aspect of the present invention, there is provided a steering system for a vehicle having a steering input device and at least one turnable vehicle wheel, the steering system comprising: a steering request detector for receiving, from the steering input device, a driver request indicative of a desired wheel angle of the turnable vehicle wheel; an actuator for acting on the at least one turnable vehicle wheel to achieve the desired wheel angle; a lane detecting arrangement for detecting a lane curvature ahead of the vehicle; and a steering control unit connected to the steering request detector, to the actuator, and to the lane detecting arrangement, the steering control unit being configured to: acquire, from the steering request detector, a signal indicative of the driver request; determine, based on the signal indicative of the driver request, a control signal for the actuator to achieve the desired wheel angle; control the actuator using the control signal, detect an abrupt wheel disturbance event; and in response to detecting the abrupt wheel disturbance event: acquire, from the lane detecting arrangement, a signal indicative of the lane curvature ahead of the vehicle; and control the actuator based on the lane curvature ahead of the vehicle.

Embodiments of the steering system according to the second aspect of the present invention may advantageously be comprised in a vehicle, further comprising a vehicle body, and at least one turnable vehicle wheel rotatably connected to the vehicle body.

According to a third aspect of the invention, there is provided a computer program configured to run the method according to embodiments of the present invention, when run on the steering control unit comprised in the steering system according to embodiments of the present invention.

In summary, aspects of the present invention thus relate to a method of controlling steering of a vehicle, comprising the steps of: acquiring a signal indicative of a driver request indicative of a desired wheel angle of a turnable vehicle wheel; determining, based on the signal indicative of the driver request, a control signal for an actuator coupled to the turnable vehicle wheel to achieve the desired wheel angle; controlling the actuator using the control signal; detecting an abrupt wheel disturbance event; and in response to detecting the abrupt wheel disturbance event: acquiring, from a lane detecting arrangement, a signal indicative of a lane curvature ahead of the vehicle; and controlling the actuator based on the lane curvature ahead of the vehicle.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
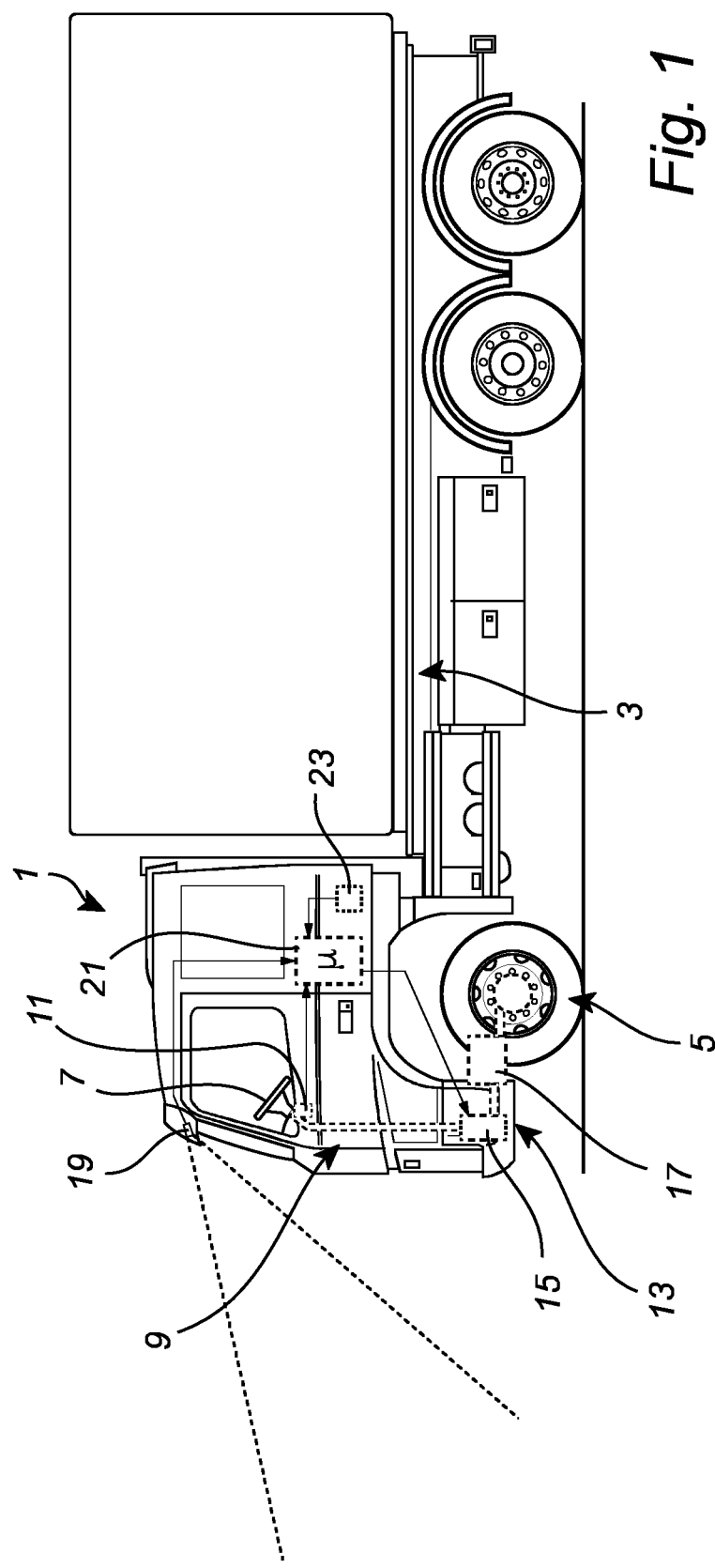
FIG. 1 is a side view of a vehicle according to an embodiment of the present invention, in the form of a truck having a steering system according to an embodiment of the invention.

FIG. 1 schematically shows a vehicle, here in the form of a truck 1, comprising a body 3 and at least one turnable vehicle wheel 5 rotatably connected to the vehicle body 3, a steering input device, here in the form of a steering wheel 7, and a steering system 9.

As is indicated in FIG. 1, the steering system 9 comprises a steering request detector 11, an actuator 13 for acting on the turnable front wheels 5, a lane detecting arrangement 19, here in the form of at least one image sensor, and a steering control unit 21.

In the example embodiment in FIG. 1, the actuator 13 comprises a first actuator in the form of an electric motor 15 and a second actuator in the form of a hydraulic steering gear 17.

In this particular example, the electric motor 15 twists a torsion rod (not shown) in the hydraulic steering gear 17. The more the torsion rod is twisted, the more a hydraulic valve is opened, which increases the hydraulic assistance acting on the turnable front wheels 5.

As is schematically illustrated in FIG. 1, the steering control unit 21 is connected to the steering request detector 11, the electric motor 15, the lane detecting arrangement 19, and external sensors, represented by the numeral 23. The external sensors 23 may be spread throughout the truck, and provide information concerning ambient conditions to the steering control unit 21.

Based on signals from the steering request detector 11 and the external sensors 23, the steering control unit 21 controls the electric motor 15 to activate the hydraulic steering gear 17 as described above. At least in some situations, the steering control unit 21 may additionally receive signals from the lane detecting arrangement 19, and control the electric motor 15 additionally based on such signals. The control of the electric motor 15 by the steering control unit 21 may additionally be based on a predetermined vehicle model, which may have been previously established based on, for example, simulations and tests.

Moreover, the steering control unit 21 may receive signals from the electric motor 15, and determine based on such signals whether or not an abrupt wheel disturbance event, such as a tire explosion, is occurring.

Figure 2:
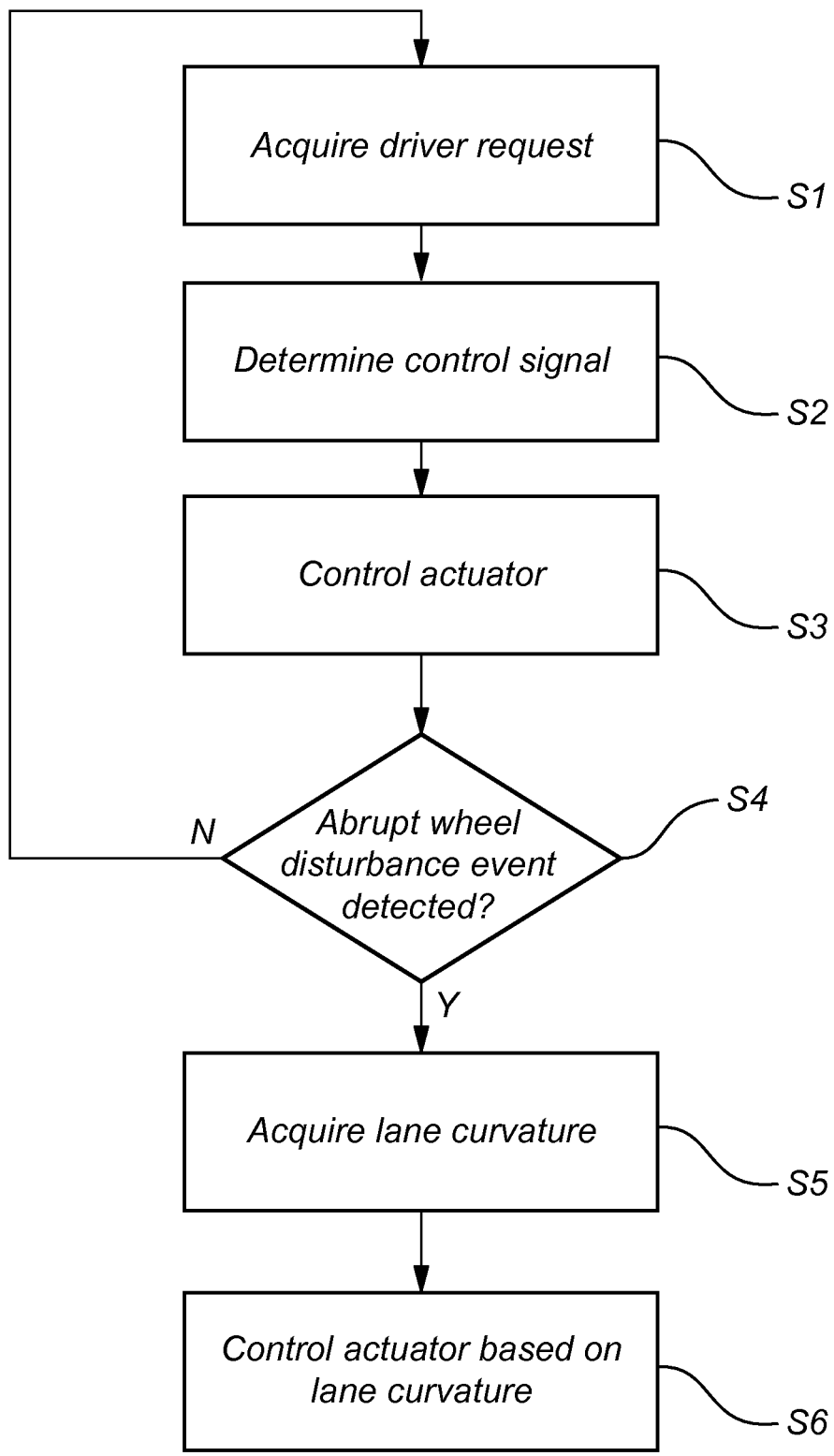
FIG. 2 is flow-chart schematically illustrating an embodiment of the method according to the present invention.

An example embodiment of the method according to the present invention will now be described with reference to the flow-chart in FIG. 2. It is here assumed that the lane keeping functionality of the steering control system 9 is initially disabled. As was mentioned further above, the lane keeping functionality may have been manually or automatically disabled.

Figure 3:
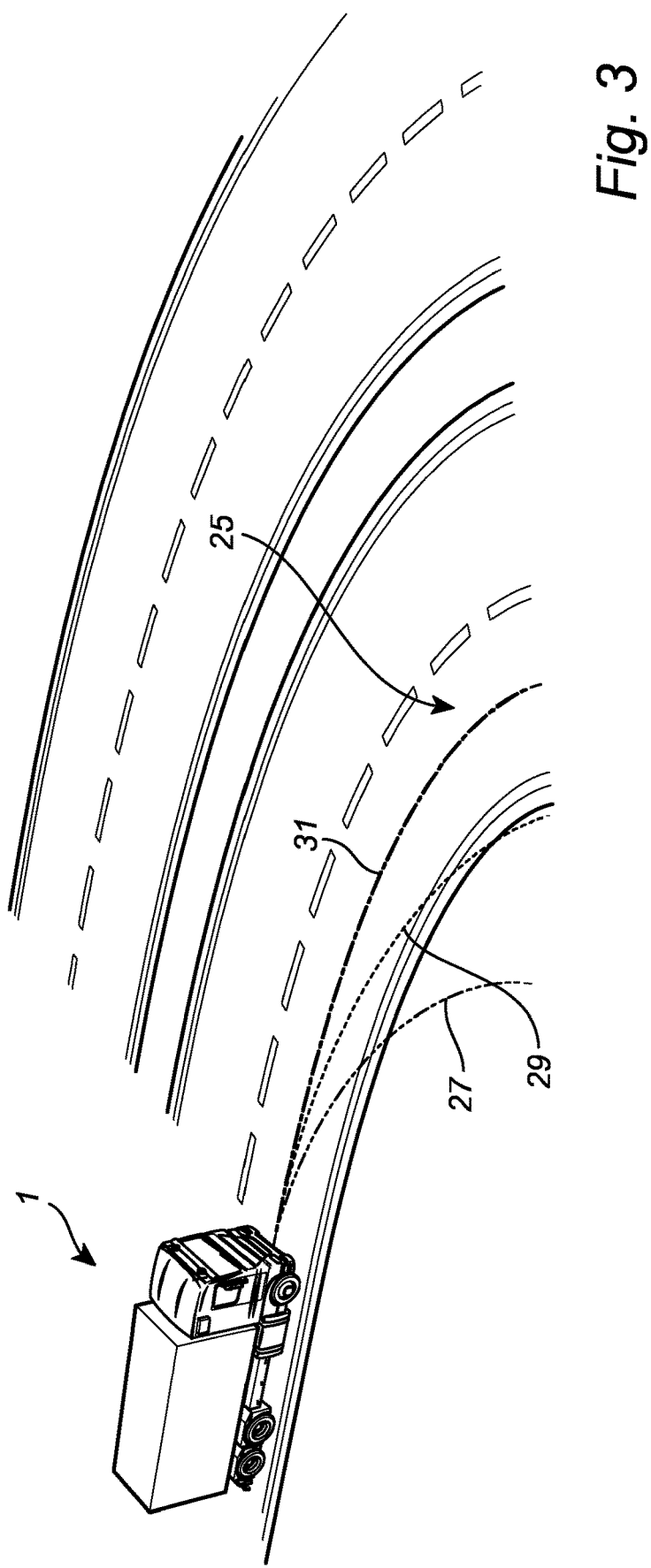
FIG. 3 schematically illustrates the effect of embodiments of the present invention.

In a first step S1, a signal indicative of a driver request is acquired from the steering request detector 11. The driver request may be indicative of a desired wheel angle, resulting in a desired trajectory 31 following the lane 25 as is schematically illustrated in FIG. 3.

Thereafter, in step S2, a control signal is determined by the steering control unit 21 in FIG. 1, based on the driver request, a vehicle model, and signals from the external sensors 23.

This control signal is, in step S3, provided by the steering control unit 21 to the electric motor 15. Based on the control signal, the electric motor 15 controls the hydraulic steering gear 17 to act on the turnable vehicle wheels 5.

In the subsequent step S4, it is determined if an abrupt wheel disturbance event has occurred. This may, for example, be carried out by measuring the current drawn by the electric motor 15, and comparing this current with the motor current that should be required, according to the vehicle model, to turn the vehicle wheels 5 in accordance with the driver request, in the absence of any external disturbances.

If it is determined in step S4 that there is no abrupt wheel disturbance event, for example by concluding that the difference between the current required to achieve the actual steering torque and the current estimated to achieve the undisturbed steering torque is smaller than a predefined threshold difference, the method loops back to the first step S1.

If it is determined in step S4 that there an abrupt wheel disturbance event occurring, for example by concluding that the difference between the current required to achieve the actual steering torque and the current estimated to achieve the undisturbed steering torque is bigger than the predefined threshold difference, the method proceeds to activate the lane keeping functionality of the steering system 9.

In the event of an abrupt wheel disturbance event, such as a tire explosion of a front wheel 5, a vehicle 1 without a feedback controlled steering system may become uncontrollable, and follow the first example trajectory 27 in FIG. 3 to end up outside the road. This may obviously result in a serious accident. If the vehicle is equipped with a steering system 9 with feedback control, such as the Volvo Dynamic Steering system, which has been conceptually described herein, it is likely that the driver will manage to control the vehicle 1 to at least initially keep the vehicle in the lane. A second example trajectory 29 schematically illustrates this in FIG. 3. Since a tire explosion on one front wheel 5 will result in front wheels with different diameters, the vehicle will drift to the side even if the wheels are controlled to the normally correct wheel angle.

To improve on this situation, or to save the situation illustrated by the first trajectory 27, the method according to embodiments of the invention proceeds to step S5 to acquire, by the steering control unit 21 from the lane detecting arrangement 19, a signal indicative of the curvature of the lane 25 ahead of the vehicle 1, and thereafter to step S6, where the electric motor 15 is controlled based on the lane curvature 31 ahead of the vehicle 1, such that the vehicle 1 is actively kept in the lane 25.

It is to be understood that the present invention is not limited to the embodiments described above and illustrated in the drawings; rather, the skilled person will recognize that many changes and modifications may be made within the scope of the appended claims. For example, the actuator 13 for acting on the at least one turnable vehicle wheel 5 may be fully electric, or fully hydraulic, etc.

The invention claimed is:

1. A method of controlling steering of a vehicle, comprising:

acquiring, from a steering request detector of a vehicle in communication with a steering input device of the vehicle, a signal indicative of a driver request, wherein the driver request is indicative of a desired wheel angle of a turnable vehicle wheel of the vehicle;

determining, based on the signal indicative of the driver request, a control signal for an actuator of the vehicle to achieve the desired wheel angle;

controlling the actuator using the control signal;

detecting an abrupt wheel disturbance event;

in response to detecting the abrupt wheel disturbance event: transitioning the steering system from a state in which lane keeping functionality of a steering system is deactivated to a state in which the lane keeping functionality of the steering system is activated;

acquiring, from a lane detecting arrangement, a signal indicative of lane curvature ahead of the vehicle;

and controlling the actuator based on the lane curvature ahead of the vehicle, wherein: detecting the abrupt wheel disturbance event comprises: acquiring a signal indicative of an actual steering torque required to achieve a desired wheel angle; and determining an occurrence of the abrupt wheel disturbance event based on the signal, comprising: determining an undisturbed steering torque required to achieve the desired wheel angle in an absence of disturbances;

comparing the actual steering torque with the undisturbed steering torque;

and determining the occurrence of the abrupt wheel disturbance event based on a determination that a difference between the actual steering torque and the undisturbed steering torque is greater than a predefined threshold difference during a time period that is longer than a predefined threshold tie period.

2. A steering system for a vehicle having a steering input device and at least one turnable vehicle wheel, the steering system comprising:

a steering request detector for receiving, from the steering input device, a driver request indicative of a desired wheel angle of the at least one turnable vehicle wheel;

an actuator for acting on the at least one turnable vehicle wheel to achieve the desired wheel angle;

a lane detecting arrangement for detecting a lane curvature ahead of the vehicle; and a steering control unit connected to the steering request detector, to the actuator, and to the lane detecting arrangement, the steering control unit configured to:

acquire, from the steering request detector, a signal indicative of the driver request;

determine, based on the signal indicative of the driver request, a control signal for the actuator to achieve the desired wheel angle;

control the actuator using the control signal;

detect an abrupt wheel disturbance event; and in response to detecting the abrupt wheel disturbance event:

transition the steering system from a state in which lane keeping functionality of the steering system is deactivated to a state in which the lane keeping functionality of the steering system is activated;

acquire, from the lane detecting arrangement, a signal indicative of the lane curvature ahead of the vehicle; and control the actuator based on the lane curvature ahead of the vehicle, wherein:

detecting the abrupt wheel disturbance event comprises:

acquiring a signal indicative of an actual steering torque required to achieve a desired wheel angle; and determining an occurrence of the abrupt wheel disturbance event based on the signal, comprising:
  determining an undisturbed steering torque required to achieve the desired wheel angle in an absence of disturbances;
  comparing the actual steering torque with the undisturbed steering torque; and
  determining the occurrence of the abrupt wheel disturbance event based on a determination that a difference between the actual steering torque and the undisturbed steering torque is greater than a predefined threshold difference during a time period that is longer than a predefined threshold time period.

3. A vehicle comprising:
a vehicle body;
at least one turnable vehicle wheel rotatably connected to the vehicle body; and
a steering system comprising:
  a steering request detector for receiving, from the steering input device, a driver request indicative of a desired wheel angle of the at least one turnable vehicle wheel;
  an actuator for acting on the at least one turnable vehicle wheel to achieve the desired wheel angle;
  a lane detecting arrangement for detecting a lane curvature ahead of the vehicle; and
  a steering control unit connected to the steering request detector, to the actuator, and to the lane detecting arrangement, the steering control unit being configured to:
    acquire, from the steering request detector, a signal indicative of the driver request;
    determine, based on the signal indicative of the driver request, a control signal for the actuator to achieve the desired wheel angle;
    control the actuator using the control signal;
    detect an abrupt wheel disturbance event; and
    in response to detecting the abrupt wheel disturbance event:
      transition the steering system from a state in which lane keeping functionality of the steering system is deactivated to a state in which the lane keeping functionality of the steering system is activated;
      acquire, from the lane detecting arrangement, a signal indicative of the lane curvature ahead of the vehicle; and
    control the actuator based on the lane curvature ahead of the vehicle,
    wherein:
      detecting the abrupt wheel disturbance event comprises:
        acquiring a signal indicative of an actual steering torque required to achieve a desired wheel angle; and
        determining an occurrence of the abrupt wheel disturbance event based on the signal, comprising:
          determining an undisturbed steering torque required to achieve the desired wheel angle in an absence of disturbances;
          comparing the actual steering torque with the undisturbed steering torque; and
          determining the occurrence of the abrupt wheel disturbance event based on a determination that a difference between the actual steering torque and the undisturbed steering torque is greater than a predefined threshold difference during a time period that is longer than a predefined threshold time period.

* * * * *